Patented Aug. 23, 1932

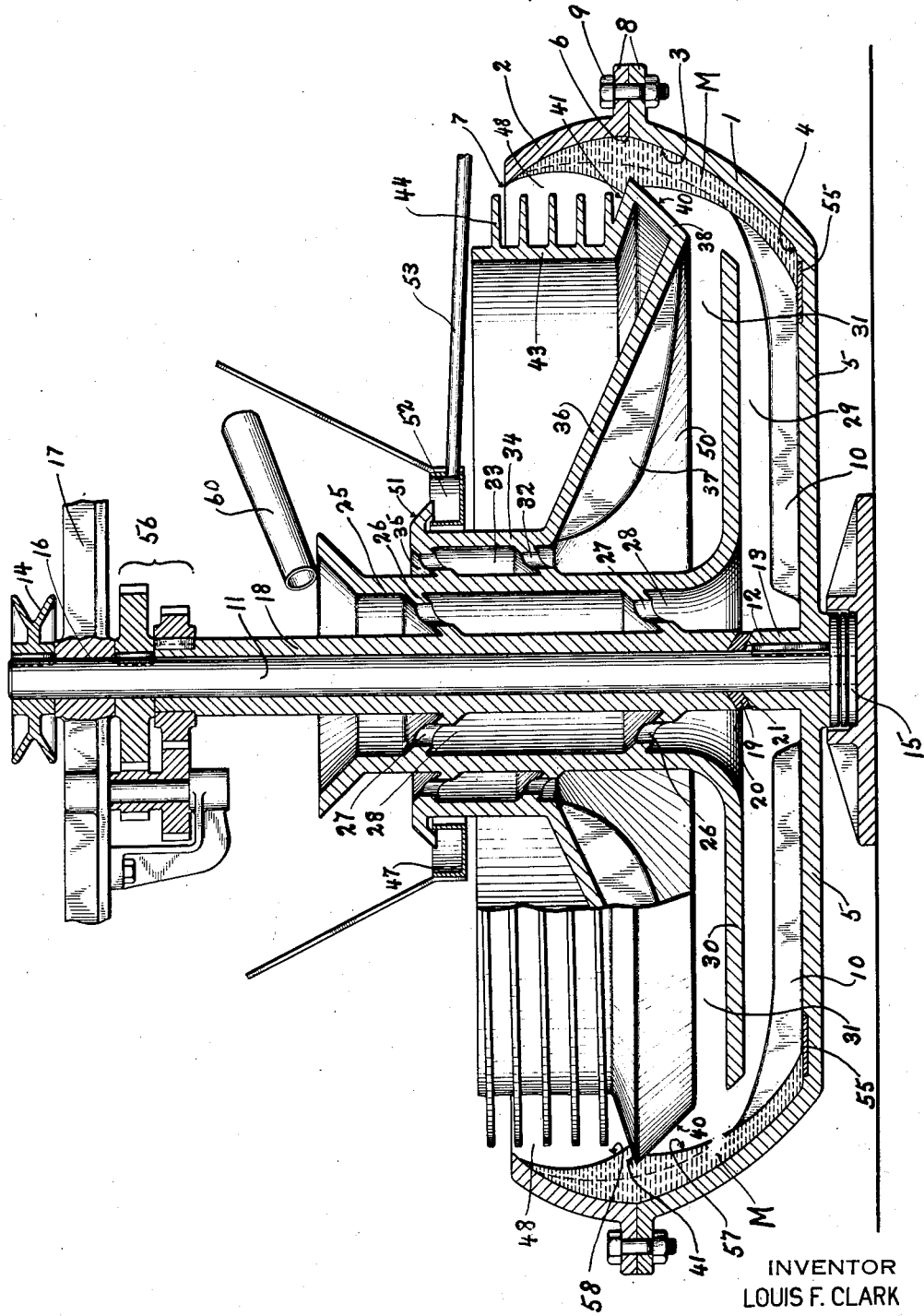

1,873,185

UNITED STATES PATENT OFFICE

LOUIS F. CLARK, OF MILWAUKEE, WISCONSIN

CENTRIFUGE

Application filed December 10, 1930. Serial No. 501,204.

This invention relates to the separation of solids from a liquid by utilizing the difference in the specific gravities of the solids and the liquid. More particularly, the invention relates to centrifuges, separators, concentrators, classifiers, deselimers, and other apparatus which are used in separating heavier solids from lighter liquids, such as minerals from water.
The present "bulk" type separators have inherent disadvantages, in that the operation is stopped periodically to take out the cake of heavier solids collected upon inclined plates, for instance, which scrape the outer edge of the separating bowl. Considerable friction is established by the plates which results in wear of the parts, and the process of getting the cake out is not continuous.

The present invention seeks to provide a separator which is continuous in operation.

It is also an object of the invention to avoid the friction of a scraper.

In one of its aspects the invention makes use of a heavy liquid of a specific gravity greater than that of the liquid in which the solids are suspended, to facilitate the recovery of the solids. For instance, mercury may be used, or both a heavy liquid and a relatively lighter liquid, such as mercury and acetylene tetrabromide may be used.

More specifically, the heavy liquid having the characteristics of mercury, under the influence of centrifugal force, lies upon the inner surface of the wall of the rotating bowl of a separator. Extending into the heavy liquid is a cooperating structure, preferably rotating at a higher rate of speed than the bowl, which directs the solids into the heavy liquid and/or facilitates their removal from the separator, as by a helical conveyor, after the heavy liquid has served to separate or classify the solids from the liquid in which they have been suspended.

The mixture of liquid and the solids to be separated therefrom is led into an inner chamber defined by the bottom of the rotating bowl of a separator, and an internal structure turning therewithin and upon the same axis as the bowl, but at a faster rate of rotation.
This internal structure extends from the central portion of the bowl to an upwardly inclined, inwardly directed peripheral channel, preferably provided by the wall of the bowl, and from which channel the internal structure is separated to provide a narrow annular space defined on the one hand by the wall of the bowl and on the other hand by an upwardly and outwardly inclined surface of said internal structure. In operation, a heavy liquid, such as mercury, in the bowl is displaced into the channel by centrifugal force, when the bowl is rotated, and seals the said annular space. An internal rotating dividing member separates the inner chamber into a lower separating passage and a return passage. The separating passage leads from an inlet passage for the mixture of solids and liquid at the center of the bowl to the heavy liquid seal where the solids are flung outwardly and upwardly into the seal. The return passage leads from the heavy liquid seal to a centrally located exit passage, through which passage the liquid is conducted after separation of the solids therefrom.

The separation of the solids from the lighter liquids is begun in the lower separating portion of the inner chamber by centrifugal force concentrating the solids at the periphery of the bowl just under the heavy liquid seal between the wall of the bowl and the upwardly inclined surface of the internal structure. This internal rotating structure, because of having a surface travelling at a faster speed through the mass of heavy liquid moving with the bowl, forces the accumulated particles of solids through the mercury seal and out of the inner chamber by a combination of angular displacement of the particles of solid by physical contact with the revolving inclined surface and the effect produced by the surface rotating through the heavy liquid, which is analagous to a lowering of the density of the heavy liquid in the portion adjacent the surface.

After the solids have passed out of the inner chamber, they may be removed from the separator in any convenient manner, such as displacement through accumulation, helical lift, or centrifugal force, or a combination thereof.

These and other objects of the invention and the means for their attainment will be more apparent from the following detailed description taken in connection with the accompanying drawing illustrating one embodiment by which the invention may be realized and which shows, in vertical sections, a separator built in accordance with the invention, the inner rotating or cooperating structure being shown partly in elevation to illustrate more clearly the details of the helical conveyor whereby continuous delivery of the separated solids is attained.

The separating bowl has an outer or peripheral wall 1, 2 having, inwardly, a concave surface 3. This wall preferably has a minimum diameter at the point 4 where the wall 1, 2 rises from the bottom 5 and curves outwardly to a maximum diameter 6 intermediate the upper and lower limits 7, 4, of the wall 1, 2, and from the point of maximum diameter 6 curves inwardly to a diameter as at 7, say, substantially half the distance of the aforesaid minimum and maximum diameters at the points 7 and 4. While the degree of curvature of the inner surface 3 of the wall 1, 2 can be varied considerably without departing from the principles of the invention, the wall 1, 2, is shown as having an inner edge 7 at a radial distance from the center of the bowl greater than at the point 4 of commencement of the curvature of the wall 1, 2 and a maximum diameter intermediate these points, as at 6, so as to present a channel-like internal peripheral recess 3. For convenience in manufacture, this wall 1, 2 may be made in two sections 1 and 2 and joined, as at the point 6 of maximum diameter for instance by flanges 8 carried by the respective wall sections 1 and 2 and bolted together as at 9.

To prevent or decrease liquid slipping in or moving relatively to the bottom of the bowl when it is rotated, a plurality of radially disposed ribs 10 extend upwardly upon the bottom 5 of the bowl and along the curved wall 1, 2. These ribs may extend along the curved wall to the upper rim 7 and be carried with the respective sections 1 and 2 of the wall, as shown in the drawing, or may be merged into the wall at any point, say, below the point of greatest diameter.

The bowl 1—10 is rotated and this rotation may be accomplished in any convenient manner. As shown, the bowl is secured to an axially disposed vertical driven shaft 11 by a key 12 between a boss 13 on the bottom 5 of the bowl, centrally thereof, and the shaft 11. The shaft 11 is rotated, say, from a prime mover by a belt (not shown) about the pulley wheel 14 keyed for driving to the upper end of the shaft 11. The shaft 11 is supported in a suitable anti-friction bearing 15 in a base and is journaled for rotation in a suitable bearing 16 supported laterally above the bowl 1—10, as in a stationary cross-member 17.

The mixture is introduced into the separator and the liquid therein is separated from the solids by the separator which includes an inner rotating structure 25 which is conveniently supported for rotation on the shaft 11. In the illustrated embodiment, a sleeve 18 supporting the said inner structure is guided laterally by a running fit around the shaft 11 and is supported in a vertical direction by a bearing 19 placed between conical surfaces 20, 21 on the lower end of the sleeve 18 and the boss 13 upon the bottom of the bowl, respectively. This bearing 19 also seals the joint.

The internal rotating structure has an inner cylindrical member 25 concentric with the sleeve 18 and spaced therefrom upon downwardly directed supports 26 which are apertured as at 27 to form, with the space 28, the inlet passage 27—28 for the mixture leading to the separating chamber 29 at the bottom of the bowl 1—10. This passage 27, 28 is continued radially to the periphery by a laterally extending dividing member 30 carried by the cylindrical member 25 which separates the inlet passage 29 from the return passage 31 thereabove, for the liquid leading from the periphery of the bowl 1—10 to the vertical passage 32, 33 between the cylindrical sleeve 25 of the inner dividing member and the outer cylindrical sleeve 34 carried therewith, said passage being formed by the apertures 32 in the supporting portions 35 and the space 33.

This outer cylindrical sleeve 34 supports, at its lower end, a conical member 36 extending downwardly and outwardly toward the lower portion of the wall of the bowl 1—10 and forming the roof of the return passage 31 for the liquid from which solids have been separated. Near the wall of the bowl, the conical member 36 carries an upwardly and outwardly inclined deflecting member 38 having an outer surface 40, which extends from the internal chamber 29, 31 to within the peripheral channel 3 occupied by the heavy liquid M so that when the bowl is rotating and the heavy liquid is held in the channel 3 by centrifugal force, the outer edge of the dihedral angle, formed by the lower deflecting surface 40 and the upper deflecting surface 41, is immersed in the heavy liquid M.

The deflection member 40, 41 carries upwardly and inwardly thereof the vertically disposed helical conveyor 43, 44 which, in operation, removes the solids which have collected therein from the heavy liquid. This helical conveyor comprises generally a cylindrical support 43 carried by the deflection member 40, 41 and one or more helical vanes 44 mounted thereon. The upper extremities of the helical vanes 44 are disposed to clear, in rotation, the upper edge of the bowl 1—10 whereby material elevated thereby may be discharged over the edge 7 of the bowl 1—10. This helical conveyor also defines the inner edge of the annular collecting chamber 48 for the solids floating out of the heavy liquid M into the space thereabove.

The radially disposed ribs 10 along the bottom of the separating passage and up the wall of the bowl tend to keep the liquids in their relative radial position with respect to the bowl and whirl the mixture of solids and liquid in the separating passage 29, and also whirls the heavy liquid M which because of the centrifugal force stands against the peripheral wall. The height and length of the ribs 10 are determined by the shape of the bowl, they being so proportioned as to prevent the mixture and the heavy liquid from slipping. For the same reason, a plurality of ribs 50 are radially disposed along the under side or roof 36 of the inner rotating member within the return passage 31 to continue the separation forces within the returning liquid in the return passage and thus remove any solids entrained in the liquid when it returns.

To assist the returning liquid out of the separator, the radial velocity of the liquid in the return passage 31 is reduced by increasing the size of the passage as it nears the outlet passage 32, 33 at the center as by inclining the roof member 36 upwardly from the periphery to the vertical cylindrical member 34 at the center. To reduce the resistance of the downwardly inclined roof of the return passage to the solids impelled outwardly by the centrifugal force, the roof 36 may be lined between the ribs 50 with rubber.

The outer cylindrical member 34 is flared at its upper end and the edge is formed with a downwardly curved lip 51 over which the liquid removed from the passage 32, 33 will pour into an annular trough 52 positioned around it and from which the liquid is conducted as by the pipe 53.

The bottom of the bowl adjacent the inclined wall is provided with an annular strip of copper 55 or other metal, which the heavy liquid will "wet" in order to prevent the heavy liquid forming an inverted meniscus, that is, a rounded edge under the influence of the centrifugal force, which would permit liquid or solids to creep under the heavy liquid M.

The internal structure 25, 44 is rotated at a faster rate than the bowl 1—10 by suitable means such as the change-speed mechanism indicated generally at 56, by which the sleeve 18 is driven from the shaft 11 at a faster speed of rotation than the shaft 11. The speed change mechanism 56 employed to regulate the relative speeds of the shaft 11 and the sleeve 18 may be such as to provide any desirable relation in speed of rotation between the shaft and the sleeve. In some situations it will be advantageous to use a mechanism whereby the relative speeds can be arbitrarily changed by adjustment under the control of the operator. The change-speed mechanism here shown is by way of illustration only and no limitation is intended by the description herein or the relative sizes of the pinions and gears shown.

In operation, the bowl is rotated and the internal structure is rotated at a greater rate than the bowl, depending upon conditions. A quantity of heavy liquid, such as mercury, is poured into the passage 28 and is by gravity carried to the chamber 29 from whence it is displaced by centrifugal force to the annular channel 3 presented by the concave inner wall of the bowl and in a position presenting a surface contour indicated substantially in the drawing by the line 57 below the deflecting member 38 and the line 58 above the deflecting member of the internal structure. The mass of the heavy liquid is marked with the character "M". For convenience in description the heavy liquid will be referred to as mercury hereafter and it is to be understood that the word "mercury" and the character "M" are used to designate any suitable heavy liquid having the characteristics of mercury, or a liquid of the characteristics of mercury and a liquid of a different specific gravity from that of mercury, such as acetylene tetrabromide, or at any rate a liquid of a greater specific gravity than the liquid in which the solids are initially suspended.

The amount of mercury to be used will be varied according to the capacity of the bowl, but in all cases, such an amount will be used, that when the bowl and the internal structure are rotated at desirable speeds, the mercury will be caused to stand out against the wall in such a position that it will contact with both surfaces 40 and 41 of the deflecting member and the inner wall of the bowl and seal the escape passage from the inner chambers 29 and 31 to the solids-collecting chamber 48 above, which these structures define.

The radially disposed ribs 10 prevent excessive slip of the mercury and maintain its velocity substantially equal to that of the bowl. The mercury above the deflector member 38 will stand in nearer to the center of the bowl than the mercury below it because of the hydrostatic pressure exerted against the mercury below by the contents of the inner chambers 29 and 31 where the mixture of liquid and solid is under the influence of centrifugal force.

The mixture of solids and liquids is poured into the inlet passage from a source of supply through a suitable means, such as the pipe 60 poised above the inlet passage, and through it gravitates to the floor of the bowl and into the separation chamber 29.

The radial ribs 10, turning with the rotating bowl 1, 10, cause the mixture to be whirled and centrifugal force causes the solids to travel outwardly to the inclined surface of the mercury and angularly displaces the solids up the inclined surface of the mercury into the wedge-shaped annular space adjacent the deflector surface 40.

The mass of solid particles continues to be forced against the lower surface 40 of the deflector member which is in relative travel through the mercury because of the excess in speed of the deflector member and a natural lag of the mercury. The mercury is affected by the surface of the deflector member passing through it in the immediate vicinity of its travel and a condition is created adjacent thereto which is believed to be analogous to a reduction of the density of the mercury.

Particles of the solids meeting the more rapidly rotating surface of the deflector member are bombarded into the mercury adjacent the deflector member where the normal characteristics of the density of the mercury have been suspended. The particles will then be immersed in the mercury and will drift outward until they pass the area of influence of the deflector member.

Beyond the influence of the deflector member, the particles of the solids will contact with the mercury of normal characteristics and will be buoyed upward to either clear the edge of the deflector member or again meet the affected mercury and be displaced outwardly.

By a continuation of this outward and upward displacement, all of the particles of the solids will eventually pass into the mercury above the deflector member and will there be buoyed inwardly into the collecting chamber 48. When the collecting chamber becomes filled, the particles will be worked into the spaces between the helical lifting vanes and carried upwardly by the action thereof to the uppermost portions of the vanes and thrown over the rim of the bowl.

The effect of the surface of the deflector member upon the mercury at the seal varies directly as the speed of the deflector member exceeds the speed of the mercury. The same speed of the deflector member over the bowl will effect different liquids or mixtures of liquids in the channel to a different degree, and it will be appreciated that by regulating the relative speed and selecting a suitable liquid or mixture of liquids, the separator built according to this invention can be made to separate solids from liquids having many different specific gravities. If the inner structure is made to rotate at a sufficient speed, all the liquids within the inner chambers may be thrown outwardly and through the seal, whereby the differentiated ingredients of the mixture may be intimately mixed or dispersed rather than separated into lighter and denser portions.

It has been found that a solution of heavy liquid and a liquid having a specific gravity less than the heavier liquid, but greater than the liquid of the mixture to be separated, can be used to advantage. Such relatively lighter liquid has been specified as acetylene tetrabromide by way of illustration. In which case, the heavier liquid stratifies outwardly away from the lighter liquid which contacts with the deflector member. Particles of the solids will pass through the lighter liquid to the heavier and be buoyed upwards past the rim, while the stratum of lighter liquid will seal out the still lighter liquid with which the particles have been introduced into the separator.

The liquid remaining after the separation, i. e., water, is forced into the return passage by the pressure of the mixture in the higher inlet passage, and is thus displaced out of the separator.

It will thus be seen that a separator has been provided which is continuous and uninterrupted in operation.

Various modifications may occur to those skilled in the art in the configuration and disposition of the component elements going to make up the separator as a whole, as well as in the so-called heavy liquid or liquids utilized, and no limitation is intended by the phraseology of the foregoing description or illustrations in the accompanying drawing, except as indicated in the appended claims.

What is claimed is:—

1. In a device for separating suspended solids from liquids, a bowl structure having an inlet for solids in suspension in liquid and an outlet for the liquid from which the solids have been separated, an internal structure within the bowl, an outlet for the solids between the bowl and the internal structure, means to rotate the structures, and separating means separate and distinct from the suspended solids selectively closing the said outlet for the solids against the liquids when the structures are rotated.

2. In a device for separating suspended solids from liquids, a bowl structure having an inlet for solids in suspension in liquid and an outlet for the liquid from which the solids have been separated, said bowl having a wall concave inwardly, an internal structure within the bowl, an outlet for the solids between the bowl and the internal structure, means to rotate the structures and separating means separate and distinct from the suspended solids disposed in the concave wall and selectively closing the outlet for the solids against the liquids when the structures are rotated.

3. In a device for separating suspended solids from liquids, a bowl structure having an inlet for solids in suspension in liquid and an outlet for the liquid from which the solids have been separated, an internal structure within the bowl, an outlet for the solids between the bowl and the internal structure, means to rotate the structures and separating means, separate and distinct from the suspended solids selectively closing the outlet for the solids against the liquids when the structures are rotated.

4. In a device for separating suspended solids from liquids, a bowl structure having an inlet for solids in suspension in liquid and an outlet for the liquid from which the solids have been separated, said bowl having a wall concave inwardly, an internal structure disposed to rotate within the bowl, an outlet for the solids between the bowl and the internal structure, means to rotate the structures and separating means selectively closing the outlet for the solids against the liquids when the structures are rotated.

5. In a device for separating suspended solids from liquids, a bowl structure having an inlet for solids in suspension in liquid and an outlet for the liquid from which the solids have been separated, sad bowl having a wall concave inwardly, an internal structure disposed to rotate within the bowl upon the same axis as the bowl rotates, an outlet for the solids between the bowl and the internal structure, means to rotate the structures and separating means separate and distinct from the suspended solids disposed in the concave wall and selectively closing the outlet for the solids against the liquids when the structures are rotated.

6. In a device for separating suspended solids from liquids, a bowl structure having an inlet for solids in suspension in liquid and an outlet for the liquid from which the solids have been separated, said bowl having a wall concave inwardly, an internal structure disposed to rotate within the bowl upon the same axis as, and relative to, the speed of the bowl, an outlet for the solids between the bowl and the internal structure, and separating means separate and distinct from the suspended solids disposed in the concave wall and selectively closing the outlet for the solids against the liquids.

7. In a device for separating suspended solids from liquids, a bowl structure having an inlet for solids in suspension in liquid and an outlet for the liquid from which the solids have been separated, said bowl having a wall concave inwardly, an internal structure disposed to rotate within the bowl upon the same axis as, and relative to, the speed of the bowl, an outlet for the solids between the bowl and the internal structure, and separating means separate and distinct from the suspended solids disposed in the concave wall and contacting with the internal structure when the structure and the bowl are rotated.

8. In a device for separating suspended solids from liquid, a bowl structure having an inlet for solids in suspension in liquid and an outlet for the liquid from which the solids have been separated, said bowl having a wall concave inwardly, an internal structure within the bowl defining with the floor of the bowl an internal chamber, an outlet for the solids between the bowl and the internal structure, means to rotate the structures and separating means separate and distinct from the suspended solids disposed in the concave wall and selectively closing the outlet for the solids against the liquids when the structure and the bowl are rotated.

9. In a device for separating suspended solids from liquid, a bowl structure having an inlet for solids in suspension in liquid and an outlet for the liquid from which the solids have been separated, said bowl having a wall concave inwardly, an internal structure within the bowl extending horizontally from the central portion toward the concave inner wall and defining with the floor of the bowl an internal chamber, an outlet for the solids between the bowl and the internal structure, means to rotate the structures, and separating means separate and distinct from the suspended solids disposed in the concave wall and selectively closing the outlet for the solids against the liquids when the structure and the bowl are rotated.

10. In a device for separating suspended solids from liquid, a bowl structure having an inlet for solids in suspension in liquid and an outlet for the liquid from which the solids have been separated, said bowl having a wall concave inwardly, an internal structure within the bowl and having a horizontally disposed member extending outwardly from the central portion and defining an internal chamber and spaced from the concave inner wall to form an annular outlet passage for the solids from the internal chamber, means to rotate the structures, and separating means separate and distinct from the suspended solids disposed in the concave wall and selectively closing the annular outlet passage against the liquids when the structure and the bowl are rotated.

11. In a device for separating suspended solids from liquid, a bowl structure having a wall concave inwardly, an internal structure within the bowl having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structure and separating means in the concave wall of the bowl and filling the annular outlet when the bowl is rotated.

12. In a device for separating suspended solids from liquid, a bowl structure having a wall concave inwardly, an internal structure within the bowl rotating upon the same axis as the bowl having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structures and separating means in the concave wall of the bowl and filling the annular outlet when the bowl is rotated.

13. In a device for separating suspended solids from liquid, a bowl structure having a wall concave inwardly, an internal structure within the bowl rotating upon the same axis as the bowl at a speed relative to the speed of the bowl, and having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structure and the bowl and separating means in the concave wall of the bowl and filling the annular outlet when the bowl is rotated.

14. In a device for separating suspended solids from liquid, a bowl structure having a wall concave inwardly, an internal structure within the bowl rotating upon the same axis as the bowl at a speed relative to the speed of the bowl, and having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structures and separating means in the concave wall of the bowl and filling the annular outlet when the bowl is rotated, said means comprising a heavy liquid of the characteristics of mercury.

15. In a device for separating suspended solids from liquid, a bowl structure having a wall concave inwardly, an internal structure within the bowl rotating upon the same axis as the bowl at a speed relative to the speed of the bowl, and having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structures and separating means in the concave wall of the bowl and closing the annular outlet when the bowl is rotated, said means comprising a heavy liquid of the characteristics of mercury and a liquid having a specific gravity less than mercury.

16. In a device for separating suspended solids from liquid, a bowl structure having a wall concave inwardly, an internal structure within the bowl rotating upon the same axis as the bowl at a speed relative to the speed of the bowl, and having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structures and separating means in the concave wall of the bowl and filling the annular outlet when the bowl is rotated, said means comprising mercury.

17. In a device for separating suspended solids from liquid, a bowl structure having a wall concave inwardly, an internal structure within the bowl rotating upon the same axis as the bowl at a speed relative to the speed of the bowl, and having an inlet passage for the suspended solids and an outlet passage for the liquid and two members extending outwardly and substantially horizontally from the central portion toward the periphery spaced apart to form a lower passage connecting with the said inlet passage and an upper passage connecting with the said outlet passage for the liquid, the uppermost outwardly extending member carrying an upwardly and outwardly inclined circular surface spaced from the wall of the bowl to form an annular outlet from the enclosed chamber, means to rotate the structures and separating means in the concave wall of the bowl and closing the annular outlet when the bowl is rotated, said means comprising mercury and a liquid having a specific gravity less than mercury.

18. A device for separating suspended solids from liquid comprising in combination, a bowl structure having a wall concave inwardly, an upwardly and outwardly inclined circular surface carried for rotation upon an inner structure and having an outer portion revolving within the cavity of the wall, a chamber defined by the inner structure and the bowl, an inlet passage for solids in suspension and outlet passage for the liquids, an outlet for the solids between the bowl and the inner structure, means to rotate the structure and the bowl and a heavy liquid of the characteristics of mercury within the cavity of the wall and selectively closing the outlet for the solids against the liquids when rotated.

19. A device for separating suspended solids from liquid, comprising in combination a bowl structure having a wall concave inwardly, an upwardly and outwardly inclined circular surface carried for rotation upon an inner structure and having an outer portion revolving within the cavity of the wall, a chamber defined by the inner structure and the bowl, an inlet passage for solids in suspension and outlet passage for the liquids, an outlet for the solids between the bowl and the inner structure, means to rotate the structures, a separating means comprising a heavy liquid of the characteristics of mercury within the cavity of the wall in contact with the walls of the bowl when rotated, and a liquid having a specific gravity less than mercury but greater than the liquid in which the solids are suspended in contact with the said inclined inner surface carried for rotation upon the inner structure, said separating liquids selectively closing the outlet for the solids against the liquids containing the solids.

20. In a centrifuge, a bowl structure having an inlet for the substance to be centrifugalized and an outlet for the resulting liquid, said bowl having a wall concave inwardly, an internal structure within the bowl extending horizontally from the central portion toward the concave inner wall and defining with the floor of the bowl an internal chamber, means to rotate the bowl and structure and separating means separate and distinct from the suspended solids selectively closing the outlet for the resulting substance when the structure and the bowl are rotated.

21. In a centrifuge device comprising an outer casing having an edge extending radially inward, an internal structure extending radially outward within the outer casing and beyond the edge of the outer casing, means to rotate the casing and the internal structure, a liquid seal carried by the outer casing in sufficient quantity so that upon rotation centrifugal force will immerse the outer edge of the internal structure therein, the seal being of a liquid having a greater specific gravity than that of the separated constituent of the liquid, an inlet to the outer casing upon one side of the internal structure, an outlet for liquid therefrom, and an outlet for the separated constituent in the casing on the other side of the internal structure and beyond the seal.

22. In a centrifuge device comprising an outer bowl having its upper edge extending radially inward, an internal structure extending radially outward within the bowl and beyond the edge of the bowl, means to rotate the bowl and the internal structure, a liquid seal carried by the bowl in sufficient quantity so that upon rotation centrifugal force will immerse the outer edge of the internal structure therein, the seal being of a liquid having a greater specific gravity than that of the separated constituent of the liquid, an inlet to the bowl upon one side of the internal structure, an outlet for liquid therefrom, and an outlet for the separated constituent in the bowl on the other side of the internal structure and beyond the seal.

23. In a centrifuge device comprising an outer casing having an edge extending radially inward, an internal structure extending radially outward within the outer casing and beyond the edge of the outer casing, means to rotate the casing, means to rotate the internal structure at a higher speed than that of the casing, a liquid seal carried by the outer casing in sufficient quantity so that upon rotation centrifugal force will immerse the outer edge of the internal structure therein, the seal being of a liquid having a greater specific gravity than that of the separated constituent of the liquid, an inlet to the outer casing upon one side of the internal structure, an outlet for liquid therefrom, and an outlet for the separated constitutent in the casing on the other side of the internal structure and beyond the seal.

24. In a centrifuge device comprising an outer bowl having an edge extending radially inward, an internal structure extending radially outward within the outer bowl and beyond the edge of the bowl, means to rotate the bowl, means to rotate the internal structure at a higher speed than that of the bowl, a liquid seal carried by the bowl in sufficient quantity so that upon rotation centrifugal force will immerse the outer edge of the internal structure therein, the seal being of a liquid having a greater specific gravity than that of the separated constitutent of the liquid, an inlet to the bowl upon one side of the internal structure, an outlet for liquid therefrom, and an outlet for the separated constituent in the casing on the other side of the internal structure and beyond the seal.

25. In a centrifuge device comprising an outer bowl structure having an upper edge extending radially inward, an internal structure extending radially outward within the outer bowl to a point adjacent the wall thereof, the internal structure extending beyond the upper edge of the bowl, the internal structure being spaced from the bottom of the bowl, a dividing member carried by one of the structures and extending radially outward to a point adjacent the wall of the bowl dividing the space between the bottom of the bowl and the internal structure, the dividing member terminating at a point radially nearer the axis of the bowl than the internal structure, means to rotate the bowl and the internal structure, an inlet upon one side of the dividing member adjacent to the axis of the bowl, an outlet for liquid upon the other side of the dividing member, and an outlet for the separated constituent between the bowl and the internal structure.

26. In a centrifuge device comprising an outer bowl having an upper edge extending radially inward, an internal structure extendtending radially outward within the outer bowl to a point adjacent the wall thereof, the internal structure extending beyond the upper edge of the outer bowl, the internal structure being spaced from the bottom of the bowl, a dividing member carried by the internal structure and extending radially outward to a point adjacent the wall of the bowl dividing the space between the bottom of the bowl and the internal structure, the dividing member terminating at a point radially nearer the axis of the bowl than the internal structure, means to drive the bowl and the internal structure, an inlet upon one side of the dividing member adjacent to the axis of the bowl, an outlet for liquid upon the other side of the dividing member adjacent to the axis of the bowl and radially more distant therefrom than the inlet, and an outlet for the separated constituent between the bowl and the internal structure.

27. In a centrifuge device comprising an outer bowl having an upper edge extending radially inward, an internal structure extending radially outward within the outer bowl to a point adjacent the wall thereof, the internal structure extending beyond the upper edge of the outer bowl, the internal structure being spaced from the bottom of the bowl, a dividing member carried by one of the structures and extending radially outward to a point adjacent the wall of the bowl dividing the space between the bottom of the bowl and the internal structure, the dividing member terminating at a point radially nearer the axis of the bowl than the internal structure, means to rotate the bowl and the internal structure, a liquid seal carried by the bowl in sufficient quantity so that upon rotation centrifugal force will immerse the outer edge of the internal structure therein, the seal being of a liquid having a greater specific gravity than that of the separated constituent, an inlet upon one side of the dividing member adjacent to the axis of the bowl, an outlet for liquid upon the other side of the dividing member, and an outlet for the separated constituents between the bowl and the internal structure and beyond the seal.

In testimony whereof I affix my signature.

LOUIS F. CLARK.

CERTIFICATE OF CORRECTION.

Patent No. 1,873,185.  August 23, 1932.

LOUIS F. CLARK.

It is hereby certified that error appears in the printed specification of the above numbered patent requiring correction as follows: Page 1, line 76, for "liquids" read liquid; page 5, line 18, claim 4, after the word "means" insert the words separate and distinct from the suspended solids; line 25, claim 5, for "sad" read said; page 6, line 1, claim 11, for "structure" read structures; and that the said Letters Patent should be read with these corrections therein that the same may conform to the record of the case in the Patent Office.

Signed and sealed this 1st day of November, A. D. 1932.

(Seal)

M. J. Moore,
Acting Commissioner of Patents.